(No Model.)
C. G. RUTZ.
HAND PIECE FOR FISHING RODS.
No. 467,202.　　　　　　　　Patented Jan. 19, 1892.
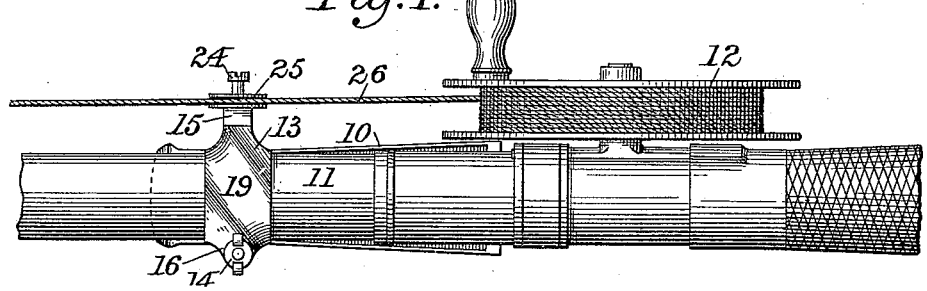
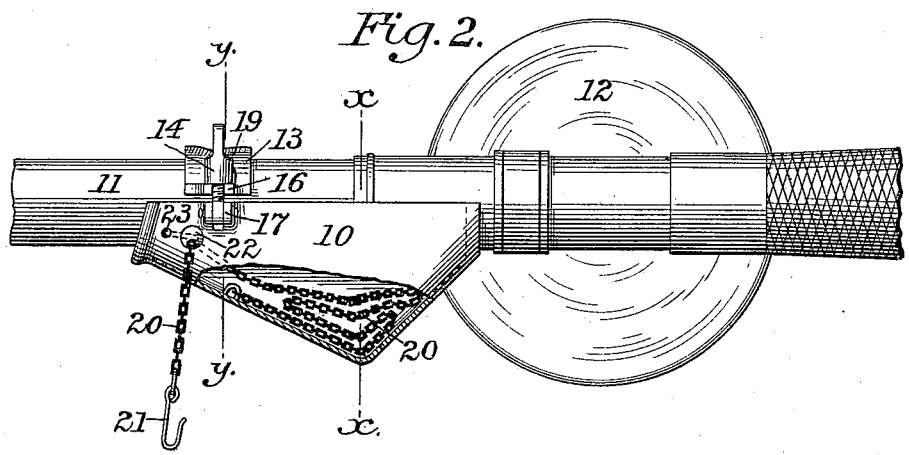
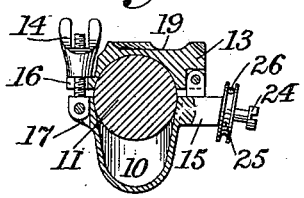
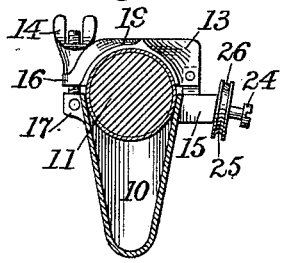
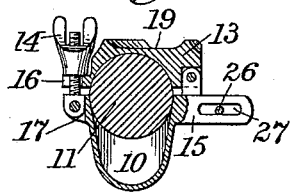
Attest:
A. N. Jesbera.
A. Widder.
Inventor:
Carl G. Rutz
By David A. Burr
Atty.

UNITED STATES PATENT OFFICE.

CARL G. RUTZ, OF BROOKLYN, NEW YORK.

HAND-PIECE FOR FISHING-RODS.

SPECIFICATION forming part of Letters Patent No. 467,202, dated January 19, 1892.

Application filed June 15, 1891. Serial No. 396,308. (No model.)

*To all whom it may concern:*

Be it known that I, CARL G. RUTZ, of Brooklyn, in the county of Kings and State of New York, have invented a new and useful Hand-Piece for Supporting Fishing-Rods; and I do hereby declare that the following is a full and exact description thereof, reference being had to the accompanying drawings, and to the figures of reference marked thereon, making a part of this specification.

My invention relates to a hand-piece for supporting fishing-rods, and has for its object to provide a neat, light, economic, and durable device capable of being expeditiously and conveniently attached to or removed from any fishing-rod without marring or otherwise defacing it, the device being so shaped that it may be firmly grasped by the hand of the manipulator of the rod to insure a steady support for the latter, and thereby prevent the rod from turning in the hand during the manipulation of a reel.

A further object of the invention is to provide the hand-piece with a guide attachment operating to direct the line evenly upon the reel during the process of winding.

Another object of the invention is to provide the hand-piece with an attached chain capable of being concealed when not in use and adapted for securing the rod to any convenient support.

The invention consists in the novel construction and combination of the several parts, as will be hereinafter fully set forth, and pointed out in the claims.

Referring now to the accompanying drawings, in which similar letters of reference indicate the same parts in all the figures, Figure 1 is a plan view of a portion of a fishing-rod having the improvement applied. Fig. 2 is a side elevation of the rod and device, the hand-piece being partially in section. Fig. 3 is a vertical section on line $xx$ of Fig. 2. Fig. 4 is a similar section on line $yy$ of Fig. 2; and Fig. 5 is a similar section to that shown in Fig. 4, illustrating a modified form of the line-guide.

The hand-piece 10 may be made of any desired material. Preferably, however, sheet metal is used as thin as possible consistent with strength.

The hand-piece is approximately U-shaped in cross-section, the top being open, and is of greatest depth at or near its center, the ends being shallow.

By reason of the variance in the depth of the hand-piece it appears in side elevation somewhat triangular, although its outer face is cylindric, and this peculiar contour is preferred, as that portion of the device representing the apex of the triangle perfectly fits in the palm of the hand and a firm hold is obtained upon the hand-piece at both the front and rear.

The upper surface of the hand-piece is concaved to fit the convexity of the under surface of the rod 11, at which point it is adapted to be secured adjacent to the reel 12, the latter being of any approved construction.

The attachment of the hand-piece to the rod is usually effected, as illustrated, through the medium of a clamp 13 and set screw and nut 14. The clamp is of the yoke pattern, being concaved in the under face to neatly engage with the top and sides of the rod. One end of the clamp is hinged upon an offset 15, located at one side of the hand-piece, ordinarily near the front, the opposite extremity of the clamp having a slotted lip 16 formed therein, as is best shown in the cross-sectional views. Immediately beneath the lip of the clamp a lug 17 is located upon the hand-piece, in or to which the lower end of the screw above referred to is pivoted, and the nut carried by the screw is preferably of the winged pattern. In the top surface of the clamp 13 a diagonal groove or channel 19 is produced, adapted to receive the thumb when the shell 10 is grasped by the hand, thus affording the manipulator of the rod all possible purchase thereon.

A chain 20 is normally coiled or otherwise disposed in the hand-piece or shell, as shown in Fig. 2, the inner end of the chain being fastened to the hand-piece in any approved manner, and the outer end, which carries a hook 21 or its equivalent, is passed out from the shell or hand-piece through an opening 22 in one side, adjacent to which a small aperture 23 is located. The chain when not in use is concealed within the hand-piece; but the hook remains outside, it being entered into the small aperture 23. The chain is very useful, and is especially adapted to secure the rod in a fixed position in connection with a convenient support, the operation being readily effected by drawing the chain from the hand-piece, wrapping it around the support, the rod, and the hand-piece, and securing the hook to the latter by inserting it in the aperture 23 or link of the chain.

The offset 15 of the hand-piece or shell has attached thereto or integral therewith a headed pin 24, having preferably a downward inclination, and upon this pin a peripherally-grooved wheel 25 is loosely mounted. The line 26, leading from the tip of the pole to the reel, passes over the wheel, which as the reel is turned moves laterally, and as the wheel is in front of the reel, as shown in Fig. 1, the movement of the former effectually guides the line to the latter and causes the line to reel smoothly and evenly. As a substitute for the guide-wheel 25 the offset 15 may be extended some distance beyond the side of the shell and provided with a slot 27, through which the line may be passed, as shown in Fig. 5.

In operation the hand-piece and its clamp are grasped by the left hand, the reel being manipulated with the right, and by reason of the attached hand-piece a heavy rod may be held firmly and without inconvenience even by persons possessing but comparatively little strength in the hand and wrist.

In attaching the device to a rod the shell is brought in close engagement with preferably the under side of the rod, the clamp is made to engage with the upper face of the latter, the screw is made to enter the slot in the clamp-lip, and the clamp and shell are drawn together by manipulating the nut carried by the screw.

I desire it to be distinctly understood that instead of a shell a block may be employed and that the contour of the block or shell may be varied at will within the general limits herein indicated and set out in the claims. It is obvious that the device may be adjusted upon the rod either toward or from the handle to accommodate arms of different length.

What I claim is—

1. As an improved article of manufacture, the hand supporting grip shell or block substantially U-shaped in cross-section and triangular in side elevation, and a clamping device whereby the grip shell or block may be secured to a pole, substantially in the manner and for the purpose herein set forth.

2. As an attachment to a fishing-rod, a hand supporting grip shell or block substantially U-shaped in cross-section and triangular in side elevation and having its upper surface concaved, a clamp to encircle the rod, and means for connecting the two, substantially in the manner and for the purpose herein set forth.

3. As an attachment to fishing-rods, a hand supporting chambered grip shell or block, a clamp connected with the shell or block, a chain contained in the chamber of the block or shell, and means to attach the chain to the shell, substantially in the manner and for the purpose herein set forth.

4. As an attachment to fishing-rods, a hand supporting grip shell or block, a clamp connected with the shell or block, and a chain having an end secured within the chamber of the shell and the other end extending out therefrom and provided with a grapple, substantially in the manner and for the purpose herein set forth.

5. As an attachment to fishing-rods, a hand supporting grip shell or block essentially triangular in side elevation, and a clamp adapted for engagement with the block or shell, provided upon its outer face with a diagonal groove or channel, as and for the purpose specified.

6. As an attachment to fishing-rods, a hand supporting grip shell or block, a clamp engaging with the same, and a guide-wheel carried by said shell or block and capable of rotary and lateral movement, substantially in the manner and for the purpose herein set forth.

7. As an attachment to fishing-rods, a hand supporting grip shell or block, a clamp engaging with the same, a headed pin having a downward inclination attached to said shell or block, and a peripherally-grooved wheel loosely mounted on said pin, substantially in the manner and for the purpose herein set forth.

8. As an attachment to fishing-rods, a hand supporting grip shell or block, a clamp engaging with the same, and a line-guide at one side of the block or shell, substantially in the manner and for the purpose herein set forth.

In testimony whereof I have signed my name to this specification in the presence of two subscribing witnesses.

CARL G. RUTZ.

Witnesses:
  A. N. JESBERA,
  A. WIDDER.